United States Patent [19]  [11] Patent Number: 4,699,502
Araki et al.  [45] Date of Patent: Oct. 13, 1987

[54] COPYING MACHINE EXPOSURE ADJUSTMENT DEVICE

[75] Inventors: Yasuo Araki, Fujiidera; Kazuyuki Kurata, Nara, both of Japan

[73] Assignee: Sharp Kabushiki Kaisha, Osaka, Japan

[21] Appl. No.: 829,910

[22] Filed: Feb. 18, 1986

[30] Foreign Application Priority Data

Feb. 19, 1985 [JP] Japan ............................... 60-33590

[51] Int. Cl.$^4$ ............................................. G03G 15/04
[52] U.S. Cl. .................................... 355/14 E; 355/68; 355/69
[58] Field of Search ................. 355/14 E, 14 R, 14 C, 355/67, 68, 69

[56] References Cited

U.S. PATENT DOCUMENTS

| | | | |
|---|---|---|---|
| 4,124,294 | 11/1978 | Nakamura | 355/68 |
| 4,361,395 | 11/1982 | Washio et al. | 355/14 C X |
| 4,436,410 | 3/1984 | Komiya | 355/14 E |
| 4,474,453 | 10/1984 | Yanagawa et al. | 355/14 R X |
| 4,474,460 | 10/1984 | Suzuki | 355/69 X |
| 4,527,093 | 7/1985 | Yamauchi et al. | 355/69 X |
| 4,573,787 | 3/1986 | Sanbayashi et al. | 355/69 X |
| 4,583,839 | 4/1986 | Suzuki | 355/14 R |

FOREIGN PATENT DOCUMENTS 2600933 7/1976 Fed. Rep. of Germany.

Primary Examiner—Arthur T. Grimley
Assistant Examiner—J. Pendergrass
Attorney, Agent, or Firm—Birch, Stewart, Kolasch & Birch

[57] ABSTRACT

A copying machine exposure adjustment device, including an operation panel that converts user operations into digital signals, a digital operation circuit that processes operational data from the operation panel and computes exposure data, a D/A converter that converts exposure data sequentially transmitted from the digital operation circuit into analog exposure data, a copy-lamp control circuit that adjusts the light volume of a copying lamp in response to the exposure data from the D/A converter, an image density circuit that detects light reflected from the original document, and a data correction circuit that corrects the exposure data from the D/A converter in response to the image density data from the image density detector circuit while the automatic exposure mode is in operation.

5 Claims, 2 Drawing Figures

COPYING MACHINE EXPOSURE ADJUSTMENT DEVICE

BACKGROUND OF THE INVENTION

The present invention relates to a copying machine exposure adjustment device for properly adjusting the exposure before it is applied to copying papers. Conventional copying machines require that the user determine the exposure amount and adjust to the desired level through the manual operation of a switch to control the exposure. Even when utilizing automatic exposure systems, operators are obliged to set the exposure level initially, which is an inconvenience. Furthermore, since conventional copying machine exposure adjustment devices use analog means, in which the data analyzing is inferior, to process all of the operational input data, the exposure setting generally falls short of satisfactory results. Using such conventional means, operators cannot choose the optimum exposure amount which precision before copying, especially under adverse conditions such as copying a photograph.

SUMMARY OF THE INVENTION

To eliminate the disadvantages described above, the present invention aims at providing an extremely useful copying machine exposure adjustment device capable of digitally processing and serially transmitting the operational data to a D/A (digital to analog) converter. The exposure adjustment device embodied by the present invention also features an automatic exposure mode which is capable of determining the optimum exposure amount based on data obtained by monitoring the original. As a result, the exposure adjustment device of the present invention involves simple operations for easier handling in addition to simplified hardware which enables operators to precisely adjust the exposure.

Other objects and further scope of applicability of the present invention will become apparent from the detailed description given herein. It should be understood, however, that the detailed description and specific examples, while indicating preferred embodiments of the invention, are given by way of illustration only, since various changes and modifications within the spirit and scope of the invention will become apparent to those skilled in the art from the following detailed description.

Specifically, the copying machine exposure adjustment device embodied by the present invention is comprised of the following: An operation panel converting user operations into digital signals, digital equipment that computes data from the operation panel to determine the exposure data, a D/A converter that converts exposure data as it is transmitted sequentially from said digital equipment into analog exposure data, a copy-lamp control circuit that adjusts the copy lamp in accordance with exposure data from the D/A converter, an image density circuit that detects light reflecting from the original, and a data compensation circuit that corrects the exposure data from the D/A converter during the automatic exposure mode in response to the image density data from the image density detector circuit.

BRIEF DESCRIPTION OF THE DRAWINGS

The present invention will be better understood from the detailed description given hereinbelow and the accompanying drawings which are given by way of illustration only, and thus are not limitative of the present invention and wherein.

DETAILED DESCRIPTION OF THE PREFERRED EMBODIMENTS

Figure 1:
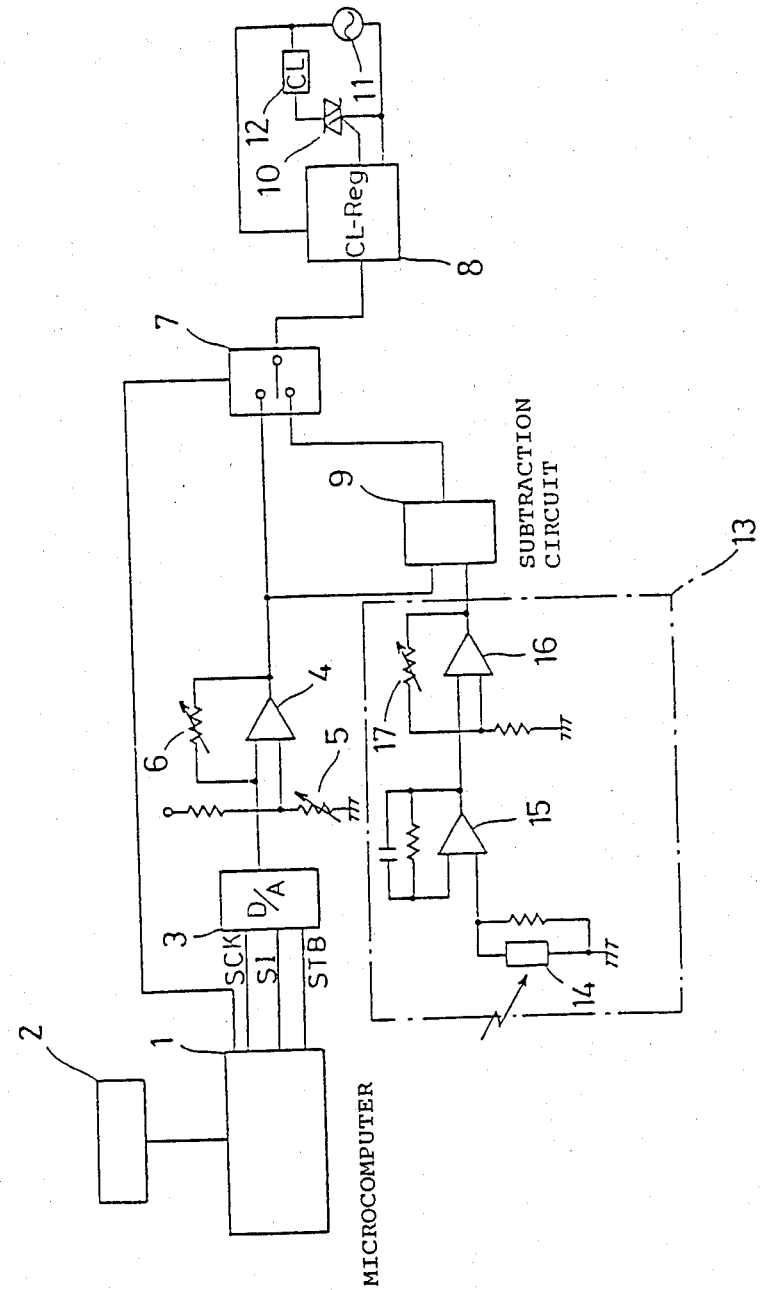
FIG. 1 is a simplified block diagram of the circuit of the copying machine exposure adjustment device embodied by the present invention.
Figure 2:
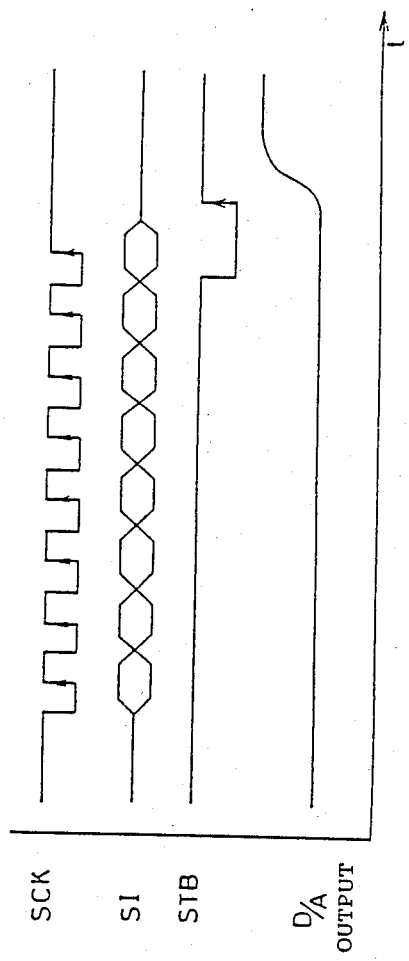
FIG. 2 is a time chart explaining the sequential operation of signals sent from the CPU to the D/A converter.

FIG. 1 is a simplified block diagram of the entire circuit of the copying machine exposure adjustment device embodied by the present invention. The reference numeral 1 indicates a central processing unit (i.e., digital equipment) made of a single LSI chip, which processes data in an 8-bit unit. The reference numeral 2 indicates an operation panel of the copying machine, which is provided with copy button and number keys. The operation panel 2 converts the user input operation into digital signals for transmittal to the central processing unit (CPU). The CPU 1 then processes the received data to compute the reference exposure data D. Since the exposure data is substantially composed of 8-bit data, it can be provided with a maximum of 256 steps ranging from zero (0) to 255. The reference numeral 3 indicates a D/A converter to which the reference digital exposure data D computed by the CPU 1 is sequentially transmitted, and which converts reference digital exposure data D into analog exposure data D for delivery to an operational amplifier 4. As shown in FIG. 2, the CPU 1 sequentially transmits the reference digital exposure data D to the D/A converter 3 in the state of an 8-bit serial data SI together with clock pulse SCK. The CPU 1 latches a serial data SI whenever the clock pulse SCK rises. The CPU 1 delivers the strobe pulse STB immediately after it reads the 8th serial data SI. Simultaneous with the rise of the strobe pulse STB, the D/A converter 3 outputs the reference analog exposure data D to the operational amplifier 4. On receipt of the reference analog exposure data D from the D/A converter 3, the operational amplifier 4 outputs reference analog exposure data D' which then becomes (Vo +D.i). The reference numeral 5 indicates a resistor that provides the reference value Vo, whereas the reference numeral 6 indicates a resistor that adjusts the value of constant "i". The reference numeral 7 indicates an analog switch which transmits the reference analog exposure data D' to a copy-lamp control circuit 8 in response to a switching signal from the CPU 1 when the exposure is manually executed. The analog switch 7 transmits the reference analog exposure data D' to the copy-lamp control circuit 8 through a subtraction circuit (i.e., the data compensation circuit) 9 when the copier is in the automatic reference exposure mode . In accordance with the level of the exposure data D', the copy-lamp control circuit 8 feeds a trigger pulse to a triac switch 10. This causes the phase of AC power source 11 to be controlled so that the light volume of the copying lamp 12 can be adjusted to an optimum level. In addition, the copy-lamp control circuit 8 properly compensates for the varied voltages of the AC power source 11 to constantly maintain a beneficial exposure. The reference numeral 13 indicates an image density detector circuit which is comprised of a silicon blue cell 14, and operational amplifiers 15 and 16. The silicon blue cell 14 is the photo sensor that detects the amount of light reflected from the original and outputs a specific voltage proportional to the received light volume. Operational amplifier 15 acts as a buffer, whereas operational amplifier 16 amplifies the voltage output from the silicon blue cell 14 by the operational amplifier 15 and transmits the amplified voltage as the original image density data VA. The reference numeral 17 indicates a resistor that adjusts the amplitude of the operation amplifier 16. By keeping the exposure data D constant, the resistor 17 performs adjustments so that the difference between the voltage fed to copying lamp 12 after detection of an original with high image density and the voltage fed to the copying lamp 12 after detection of an original with low image density remains the optimum value. When the automatic exposure mode is in operation, the image density data VA is delivered to the subtraction circuit 9 together with the exposure data D'. The subtraction circuit 9 corrects the exposure data D' by applying the image density data VA, and as a result, the exposure data D'' to be denoted as (Vo+D.i−VA) is delivered to the copy-lamp control circuit 8. Consequently, the less dense the image on the original, the greater the value of VA, thus diminishing the value (Vo+D.i−VA) to reduce the exposure. The automatic exposure mode thereby executes its function fully. When the exposure data D is to be kept constant, the value (Vo+D.i−VA) present during the automatic exposure mode is lower than the value (Vo+D.i) which is present in the manual exposure mode. Therefore, the CPU 1 outputs a greater exposure value during the automatic exposure mode than it delivers during the manual exposure mode to compensate for this difference. If the exposure level is to be modified during the automatic exposure mode, the exposure value D may be either increased or decreased by the user. The copying machine exposure adjustment device incorporating the preferred embodiments of the present invention causes the CPU 1 to digitally execute the operations from the operation panel 2 as instituted by the user to optimize the exposure, thus making it possible for the copying machine to precisely adjust the exposure in accordance with specific exposure conditions. In addition, since the exposure adjustment device embodied by the present invention serially transmits the digital exposure data D from the CPU 1 to the D/A converter 3, the system can reduce the number of input lines of the D/A converter 3, thus simplifying the necessary hardware. Furthermore, the device corrects the exposure data D' in response to the image density of the original VA while the automatic exposure mode is underway. The corrected data is then transmitted to the copy-lamp control circuit 8 as exposure data D'', and as a result, operations on the part of the user are minimized and simplified. The system of the copying machine exposure adjustment device embodied by the present invention allows digital processing of the operational data, thus allowing the exposure amount to be precisely adjusted according to the required exposure conditions. In addition, since the exposure data from digital circuit is sequentially transmitted to the D/A converter, the number of input lines and the complexity of the hardware are decreased. Furthermore, since the exposure amount can be precisely determined by correcting the exposure data while the automatic exposure mode is underway, user operation are minimized and simplified.

While only certain embodiments of the present invention have been described, it will be apparent to those skilled in the art that various changes and modifications may be made therein without departing from the spirit and scope of the present invention as claimed.

What is claimed is:

1. A copying machine exposure adjustment device having a manual exposure mode and an automatic exposure mode, comprising:
    an operation panel that converts user operations into digital operational data;
    digital operation means for processing said operational data from said operation panel and computing exposure data corresponding to said operational data;
    D/A converter means for converting said exposure data from said digital operation means into analog exposure data;
    copy-lamp control means for adjusting the volume of light of a copying lamp of the copying machine response to said analog exposure data from said D/A converter means;
    image density detector means for detecting light reflected from an original document to be copied and outputting an image density data signal in response thereto; and
    data correction means for correcting said analog exposure data from said D/A converter means in response to the image density data signal from said image density detector means while said automatic exposure mode is operational.

2. A copying machine exposure adjustment device as claimed in claim 1, wherein said digital operation means comprises a microcomputer.

3. A copying machine exposure adjustment device as claimed in claim 1, wherein said exposure data from said digital operation means is transferred to said D/A converter means serially.

4. A copying machine exposure adjustment device as claimed in claim 3, wherein said exposure data from said digital operation means consists of 8-bit data.

5. A copying machine exposure adjustment device as claimed in claim 1, wherein said data correction means comprises a subtraction circuit, said subtraction circuit subtracting the image density data signal from the analog exposure data to correct said analog exposure data in response to the density of the original document image.

* * * * *